United States Patent
Takanashi

[19]

[11] Patent Number: 5,833,033
[45] Date of Patent: Nov. 10, 1998

[54] WEAR DETECTOR FOR BRAKE PADS

[75] Inventor: Hitoshi Takanashi, Yokkaichi, Japan

[73] Assignee: Sumitomo Wiring Systems, Ltd., Japan

[21] Appl. No.: 876,971

[22] Filed: Jun. 16, 1997

[30] Foreign Application Priority Data

Jun. 19, 1996 [JP] Japan .................................. 8-158355

[51] Int. Cl.⁶ ............................. F16D 66/02; B60T 17/22
[52] U.S. Cl. ................................ 188/1.11 L; 188/1.11 E; 340/454
[58] Field of Search ...................... 188/1.11 E, 11.1 C; 73/129, 130; 340/454; 116/208; 192/30 W

[56] References Cited

U.S. PATENT DOCUMENTS

| 3,675,197 | 7/1972 | Bennette et al. ..................... | 188/1.11 L |
| 4,869,350 | 9/1989 | Fargier et ............................ | 188/1.11 L |
| 5,133,431 | 7/1992 | Braun ................................. | 188/1.11 L |
| 5,307,673 | 5/1994 | Ito et al. ................................ | 340/454 |
| 5,454,450 | 10/1995 | Tanigawa ............................ | 188/1.11 L |

FOREIGN PATENT DOCUMENTS

| 0320167 | 6/1989 | European Pat. Off. . |
| 0610828 | 8/1994 | European Pat. Off. . |
| 2381210 | 9/1978 | France . |
| 2450979 | 10/1980 | France . |
| 2663703 | 12/1991 | France . |
| 64440 | 1/1994 | Japan . |
| 2086501 | 5/1982 | United Kingdom . |

*Primary Examiner*—Robert J. Oberleitner
*Assistant Examiner*—Chris Schwartz
*Attorney, Agent, or Firm*—Jordan B. Bierman; Bierman, Muserlian and Lucas

[57] ABSTRACT

A wear detector in a brake pad is disclosed including a projection on the face of the detector extending substantially perpendicular thereto. A U-shaped signal wire is bent around the projection and spaced apart therefrom so that, when the wire is rendered discontinuous by abrasion of the brake pad, the detector body is not damaged and a signal is activated, thereby indicating that a replacement of the brake pad is required.

6 Claims, 4 Drawing Sheets ial Application 8-158355, filed Jun. 19, 1996.

BACKGROUND OF THE INVENTION

It has been known in the past to provide devices for determining when an automobile brake pad has been worn to a point at which it should be replaced. A device of this kind can be found in Japanese Utility Model Laid-Open Publication No. 6-4440. More specifically, as shown in FIG. 6, wear detector 4 comprises signal wire 1, bent in a U-shape, and base 2 which supports signal wire 1. Wear detector 4 is embedded in the brake pad so that bend 1a is oriented toward brake rotor 3.

Thus, as the brake pad wears, eventually bend 1a is exposed at the pad surface. As wear continues, bend 1a of signal wire 1 is abraded and eventually worn away. This breaks the circuit of which signal wire 1 is a part and results in a warning lamp being lit to indicate that wear limit A has been reached and the brake pad should be replaced.

However, this device suffers from certain defects. As FIG. 6 shows, the brake pad must be worn to wear limit A before signal wire 1 has been broken. Wear limit A is located exactly on end surface 2a of base 2. Therefore, if the longitudinal axis of wear detector 4 is not perpendicular to the face of brake rotor 3, it will assume the position shown in partially dotted lines. As a result, brake rotor 3 would bear against end surface 2a of support member 2 before bend 1a of signal wire 1 has been broken, thereby damaging base 2 and brake rotor 3.

Moreover, in order to soften the impact on bend 1a by brake rotor 3, base 2 is mounted somewhat loosely in the brake pad. As a result, it is not difficult for end surface 2a to be disposed at an angle other than perpendicular to rotor 3. This is an additional opportunity for damage to the rotor and the base.

SUMMARY OF THE INVENTION

It is the object of the present Invention to provide a wear detector which will indicate when the pad needs replacement, but without the danger of contact between the base and the brake rotor. The wear detector is embedded in the brake pad so that the bend in the signal wire is located at the wear limit thereof. The detector comprises a base having a detection end, oriented toward the brake surface, and a base end remote from the brake surface. The detection end has an end face which is opposed to the brake surface.

It is a feature of the present Invention that a projection is formed on the end face which extends toward the brake surface and the bend of the signal wire is wrapped therearound. In this way, since the end face is separated a substantial distance from the wear limit, the latter can be reached without danger of contact between the brake surface and the end face. This is true even if the base is tilted with respect to the brake surface.

In a preferred form of the Invention, the end surfaces of the projection are beveled toward the end face to form recesses which assist in avoiding contact between the brake rotor and the end face. Thus, the wear limit is spaced apart, in the direction of the brake rotor, from the end face.

It has been found advantageous if the projection has a transverse cross section in the shape of an arc of a circle or a triangle. In the latter case, it is desirable that the wear point, which is the point on the projection nearest the brake rotor, be located at the vertex of the triangle. As a result, additional area is provided into which the brake rotor can enter without contacting the end face.

Before the bend in the signal wire has been worn away to the point at which the indicator light is turned on, some damage to the projection will almost always occur. Moreover, even after the indicator light has been actuated, the brakes will be used a substantial number of times before relining takes place. Thus, it would be an unusual situation in which there was not damage to the projection.

In a further embodiment of the present Invention, it is provided that the projection is separate from the base, although attached thereto. Thus, when the almost inevitable damage occurs, the projection can be removed and replaced without the necessity of replacing the base of the detector. It has also been found useful if the projection extends longitudinally in a direction parallel to the brake surface and perpendicular to the bend. This renders the beveling of the ends particularly advantageous.

BRIEF DESCRIPTION OF THE DRAWINGS

In the accompanying drawings, constituting a part hereof, and in which like reference characters indicate like parts.

With reference to FIG. 4, brake rotor 11 is mounted on the wheels of the vehicle. Brake pads 12 are adapted to move into and out of contact with brake rotor 11. Wear detector 13 is embedded in one of brake pads 12 with its tip located at the wear limit of the pad.

Figure 1:
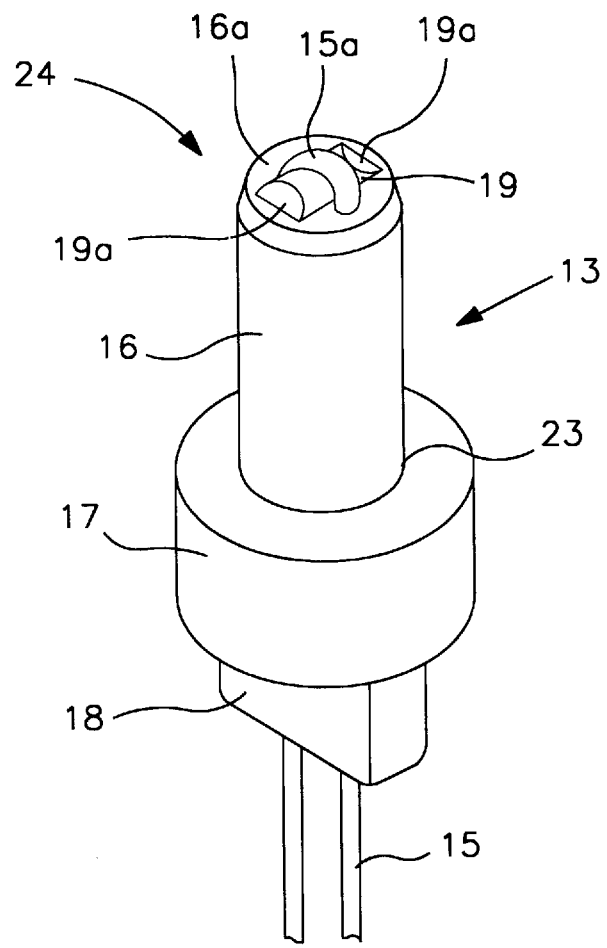
FIG. 1 is a perspective view of the detector of the present Invention.

Base 16 extends through a hole in attachment plate 21 into a complementary hole in brake pad 12. Contact portion 17 is pressed against attachment plate 21 of brake pad 12 with projecting piece 18 aiding in securing signal wire 15. Base 16 is set so that, when detector 13 is mounted, wear point C is on wear limit B. Preferably, the axis of detector 13 is located so that bend 15a is perpendicular to the direction of rotation of brake rotor 11, i.e. perpendicular to the page in FIG. 2.

Figure 2:
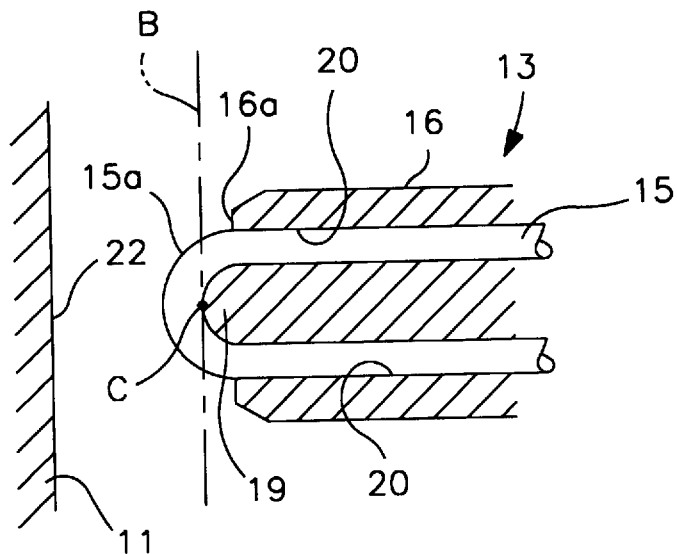
FIG. 2 is a cross section, partly schematic, of the head of the detector mounted in proper position.
Figure 4:
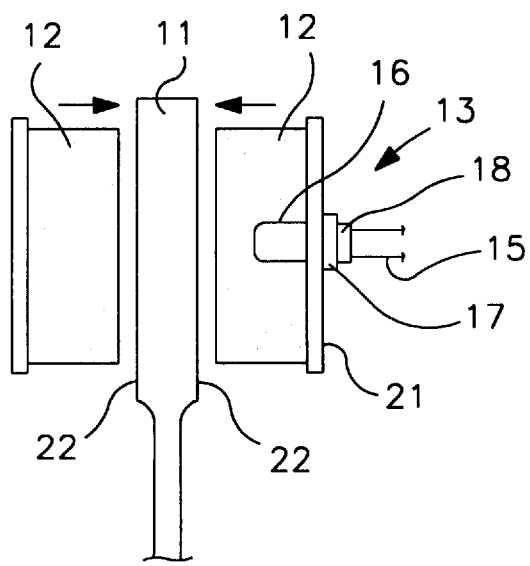
FIG. 4 is a fragmentary cross section of the relevant portions of the brake.

As can best be seen in FIGS. 1, 2, and 4, wear detector 13 comprises base 16, contact portion 17, and projecting piece 18. Signal wire 15 is threaded through holes 20 and bend 15a bears against projection 19 on end face 16a. Projection 19 is advantageously provided with bevels 19a. Base 16 has base end 23 adjacent contact portion 17 and detection end 24 terminating in end face 16a. Wear point C is on wear limit B and at the point on projection 19 which is closest to brake surface 22 of brake rotor 11.

Figure 3:
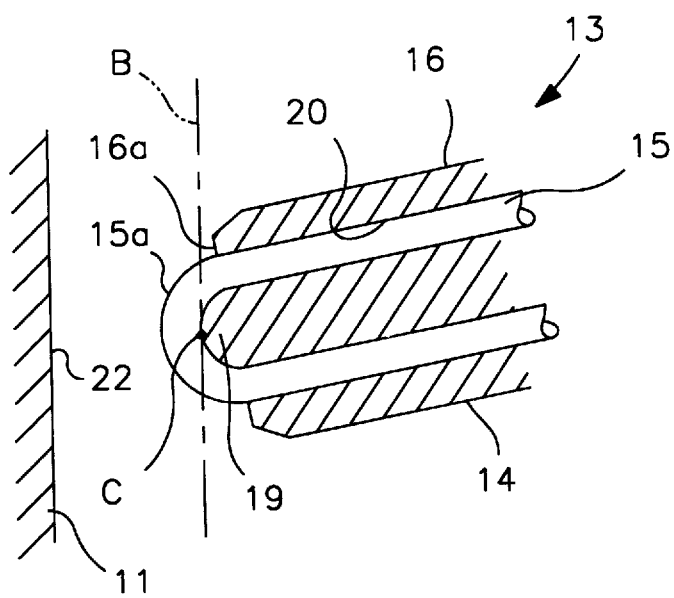
FIG. 3 is a view, similar to that of FIG. 2, wherein the detector is mounted at an angle to the brake surface.

As shown in FIG. 3, even when base 16 of wear detector 13 is out of perpendicular alignment with brake surface 22 of brake rotor 11, the corner of end surface 16a does not cross wear limit B. This is true even though the -angle as shown in FIG. 3 has been grossly exaggerated. As shown, wear will take place at the point indicated by the arrow and will continue until signal wire 15 has been entirely worn away at that point. Even then, the corner of end surface 16a is unaffected thereby.

Figure 5:
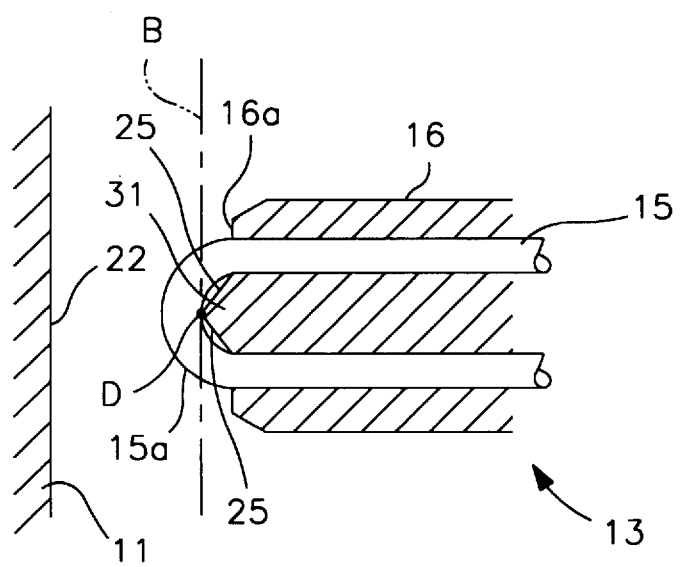
FIG. 5 is a cross section, similar to that of FIG. 2, of a modification of the present Invention.
Figure 6:
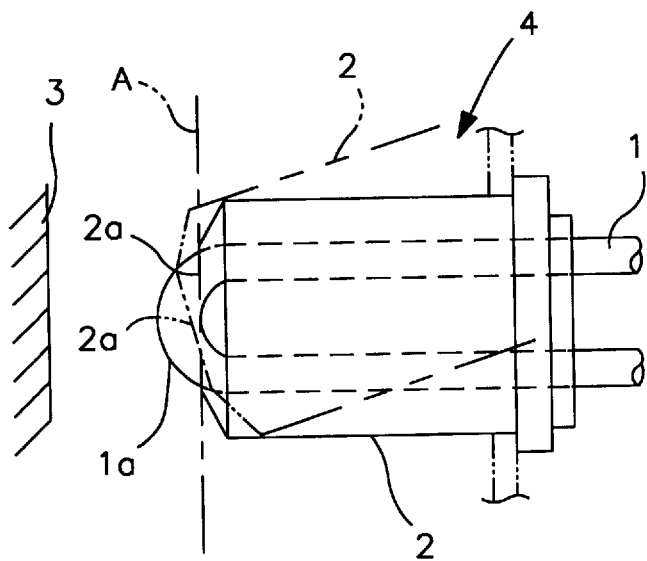
FIG. 6 is a schematic side view, similar to that of FIG. 2, of a prior art device.

A modification of the present Invention is shown in FIG. 5. Detector 13 is essentially the same as that shown in the other Figures except for the cross section of projection 31. Instead of being arcuate, it is triangular with wear point D at the vertex thereof. This provides additional spaces 25, thereby assisting in preventing any portion of end face 16a being contacted by brake surface 22 of brake rotor 11. This construction also reduces the contact at wear point D between brake surface 22 and projection 19, thereby minimizing damage thereto.

Figure 7:
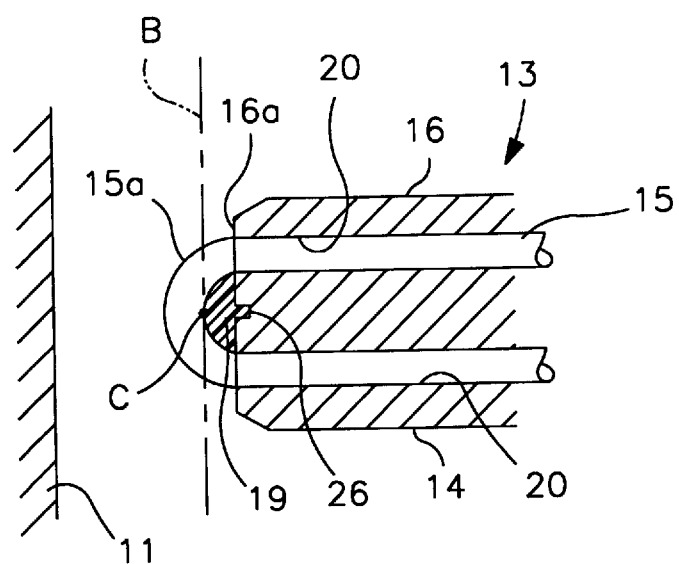
FIG. 7 is a view similar to that of FIG. 2 showing a second embodiment of the present Invention.

In FIG. 7, projection 19 is a separate element from base 16, and is secured to end face 16a by any suitable means. For example, small protuberance 26 can be formed on the side of projection 19 adjacent end face 16a and a complementary hole provided in base 16. Since signal wire 15 is held under tension after bend 15a is wrapped around projection 19, this force will hold projection 19 firmly against end face 16a. It would, under this circumstance, be quite easy to replace projection 19 when brake pads 12 are being changed. Base 16 can be retained, it is only necessary to rethread signal wire 15 through one of holes 20 around projection 19 and back through the other hole 20. Once tensioned, projection 19 is held in place.

This provides additional flexibility to the device. Projections 19 can be supplied with different heights so that wear point C and wear limit B can be varied as needed. Similarly, the material of which projection 19 is made can be selected based upon the needs of the particular environment in which it is intended to be used. Furthermore, although only semi circular and triangular cross sections of projection 19 have been shown, it would be within the scope of the present Invention to use rod shaped projections, hemispherical projections, and the like. The only requirement is that bend 15a be supported at a position which is spaced apart, in the direction of brake rotor 11 and brake surface 22, from end surface 16a.

The present Invention is described primarily with respect to vehicle disc brakes; however, the Invention is equally applicable to drum brakes and any other means for stopping or slowing movement of one surface by application of a pad thereto. Although only a limited number of specific embodiments of the present Invention have been expressly disclosed, it is, nonetheless, to be broadly construed and not to be limited except by the character of the claims appended hereto.

I claim:

1. A wear detector adapted to be embedded in a brake pad, which brake pad is adjacent a brake surface, said brake pad adapted to come into contact with said brake surface, thereby causing wear of said brake pad, said wear detector comprising a base having a detector end near said brake surface and a base end remote from said brake surface, said detection end terminating in an end face, a projection on said end face extending toward said brake surface, a wear point on said projection which is nearest said brake surface, said wear point being at the wear limit of said brake pad, a U-shaped signal wire having a bend around said projection and said wear point, said signal wire adapted to actuate an indicator when said wire is no longer continuous whereby, when said brake pad is worn to said wear point, said signal wire is broken and becomes discontinuous, and said indicator is actuated, thereby signaling that said brake pad should be replaced, said projection extending in a direction perpendicular to said bend and parallel to said end face, there being an end surface on said projection, said end surface being beveled, thereby forming a recess area at a greater distance from said brake surface than said wear point.

2. The wear detector of claim 1 wherein a cross-section of said projection, perpendicular to said end face and transverse to said projection, is an arc.

3. The wear detector of claim 1 wherein a cross-section of said projection, perpendicular to said end face and transverse to said projection, is a triangle.

4. The wear detector of claim 3 wherein said wear point is at a vertex of said triangle.

5. The wear detector of claim 1 wherein said projection is not integral with said base, whereby said projection can be replaced without replacing said base.

6. The wear detector of claim 5 wherein there is a protuberance on a side of said projection adjacent said end face, a depression in said end face complimentary to said protuberance, whereby tension in said signal wire retains said projection on said end face and said protuberance in said depression.

* * * * *